W. S. HADAWAY, Jr.
REGULATOR FOR LAUNDRY ROLLS.
APPLICATION FILED MAY 14, 1914.
1,155,481.
Patented Oct. 5, 1915.
2 SHEETS—SHEET 1.
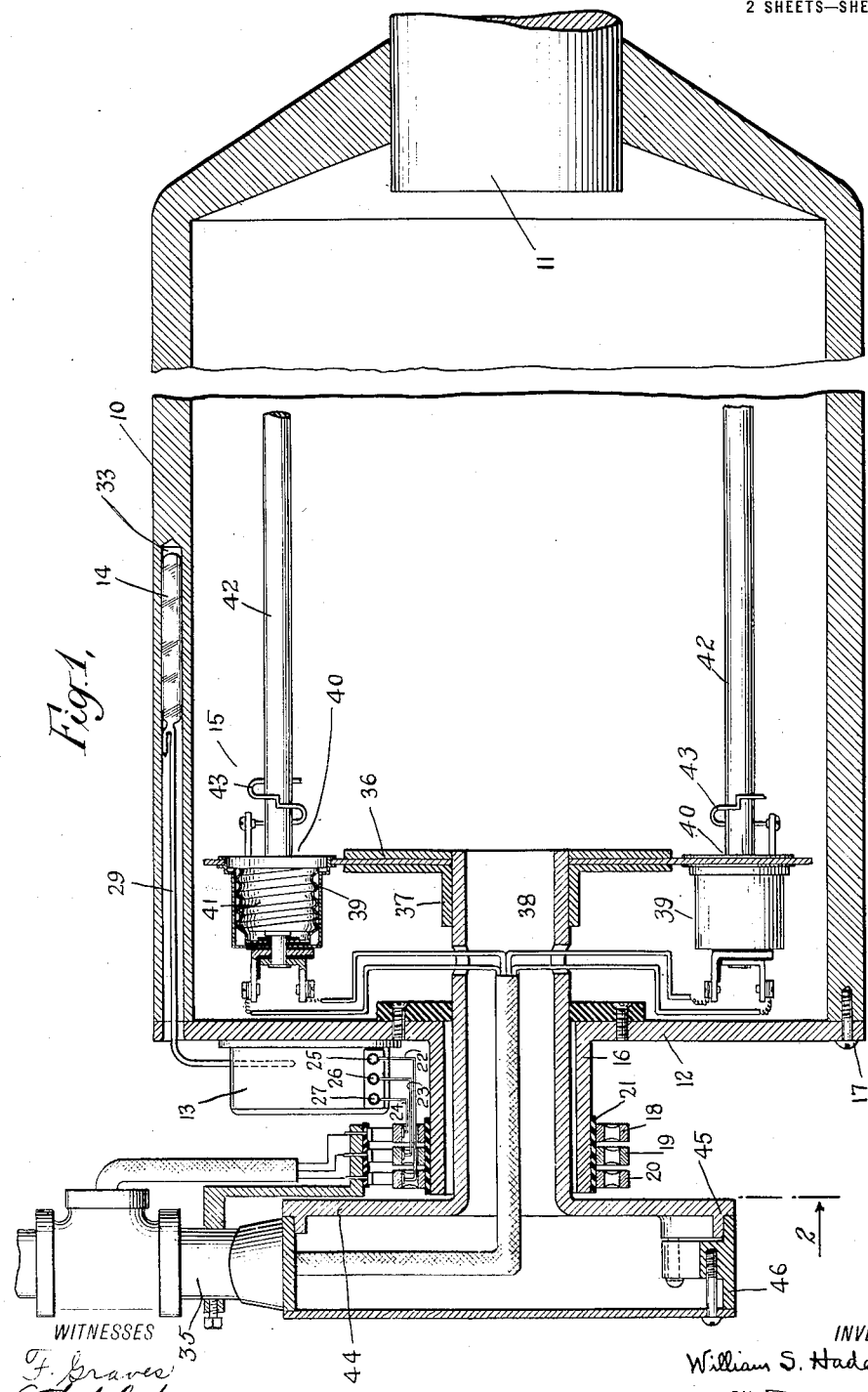
WITNESSES
INVENTOR
William S. Hadaway Jr.
BY
ATTORNEY

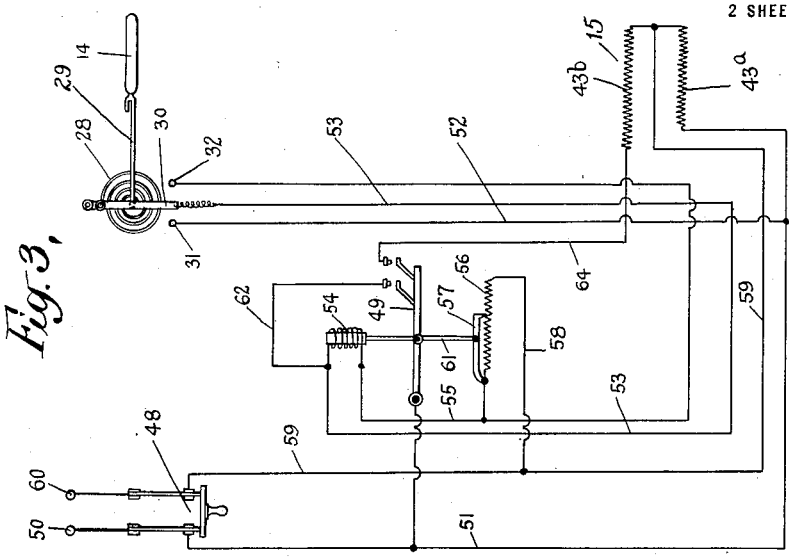
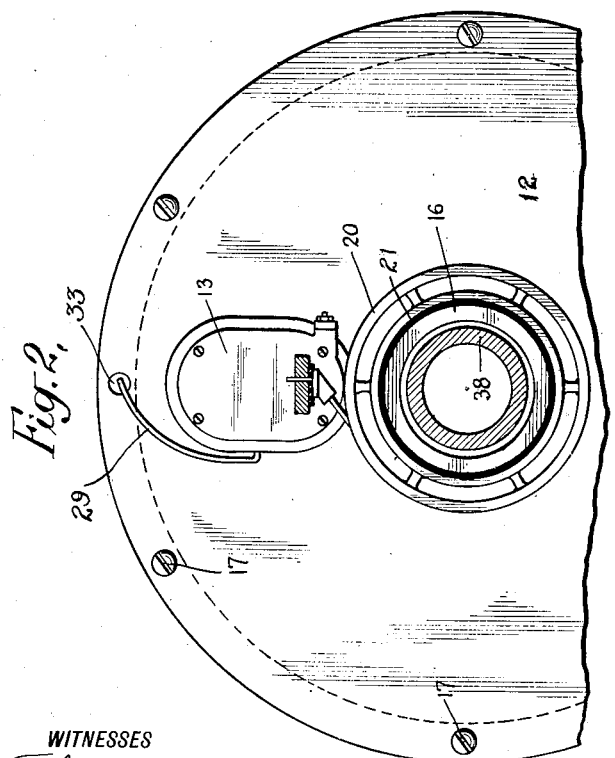
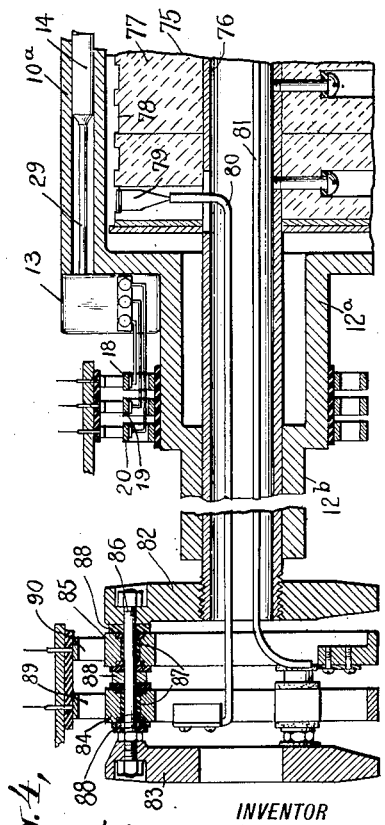

UNITED STATES PATENT OFFICE.

WILLIAM S. HADAWAY, JR., OF NEW ROCHELLE, NEW YORK.

REGULATOR FOR LAUNDRY-ROLLS.

1,155,481.  Specification of Letters Patent.  Patented Oct. 5, 1915.

Application filed May 14, 1914. Serial No. 838,441.

*To all whom it may concern:*

Be it known that I, WILLIAM S. HADAWAY, Jr., a citizen of the United States of America, and a resident of New Rochelle, Westchester county, and State of New York, United States of America, have invented certain new and useful Improvements in Regulators for Laundry-Rolls, of which the following is a specification, reference being had to the accompanying drawings, forming a part thereof.

My invention relates to regulators for heating appliances and it has special reference to such automatic regulators as are adapted to govern the energy applied to electric heaters in accordance with the variations in temperature of the working parts of the appliance.

One object of my invention is to provide a simple and compact appliance embodying a movable working member for which temperature regulation is desired, a regulator responsive to variations in the temperature of said members and an automatically controlled electric heater.

Another object is to provide a regulator which shall be constructed and arranged for attachment to a rotating body and means responsive to the regulator for automatically varying the energy supplied to a relatively stationary electric heater.

Other objects and advantages of my invention will be set forth hereinafter, and in order that my invention may be thoroughly understood, I will now proceed to describe the same in the following specification, and then point out the novel features thereof in appended claims.

My invention is well adapted for embodiment in an electrically heated laundry roll and a device of this character is shown in the drawings for purposes of illustration, although my invention is by no means limited in this regard and may be applied to various other rotatable or otherwise movable bodies.

Referring to the drawings: Figure 1 is a longitudinal section of an electrically heated laundry roll embodying my invention. Fig. 2 is a partial transverse sectional elevation of the same device taken on the line 2—2 of Fig. 1. A diagrammatic view of the circuit connections which may be utilized in connection with the device of the other figures is shown in Fig. 3. Fig. 4 is a diagrammatic sectional view corresponding to Fig. 1 of a modified structure embodying my invention.

The structure shown in Figs. 1 and 2 comprises a rotatable laundry roll 10 which may be of any suitable form and is secured to and projects outwardly from a shaft 11; a cap 12, a regulator 13, a thermometer 14, and a relatively stationary electric heater 15.

The cap 12 has a hub 16 and is removably secured to the open end of the roll 10 by screws 17. Mounted on the hub 16 near its outer end are a plurality of collector rings 18, 19 and 20 which are insulated from each other and from the hub by a sleeve 21. The rings are respectively connected by conductors 22, 23 and 24 to the terminals 25, 26 and 27 of the regulator 13.

The regulator *per se*, forms no part of my present invention and may, for example, be constructed as shown and described in my copending application Serial No. 827,362 filed March 26, 1914. It comprises as shown diagramamtically in Fig. 3, a flattened tube pressure coil 28 which is connected to the thermometer bulb 14, by a small tube 29 and is mechanically attached near its outer end to a movable contact 30 of the regulator. The movable contact is adapted to engage either one of a pair of stationary contacts 31 and 32 depending upon the variations in temperature, above and below a predetermined mean value, to which the thermometer bulb 14 is subjected. Attention is directed to the fact that the bulb is located in a longitudinal hole or recess 33 in the body of the laundry roll into which it is closely fitted as shown in Fig. 1. The location of the thermometer tube longitudinally of the roll is determined, in a general way, by the portion of the roll from which the greatest amount of heat is taken. In practice this is found to be approximately one-third of the distance from the free end of the roll.

The electric heater 15 is supported by a stationary pipe bracket 35 or other suitable means and may be of any suitable construction. It comprises as shown, a sheet metal plate or disk 36 which is removably mounted on the inner end of a tubular projection 38 of the stationary bracket. Secured to the disk near the inner walls of the roll 10 are a plurality of sockets 39 in which heater units 40 are mounted. Each of the units has a base 40 which resembles a lamp base and the structure of the heater may correspond to that shown and described in my copending application Serial No. 823,371 filed March 9, 1914. It comprises in general, in addition to the base 41, a central insulated rod 42 which extends into the laundry roll parallel to its axis and has coiled about it a resistance conductor 43 which is connected to the insulated rod near its outer end. The units are thus removable and interchangeable and they are so constructed as to operate at radiant heat and thereby transfer a large proportion of the generated heat directly to the walls of the roll.

The hollow projection 38 forms a part of a cap 44 having a flange 45 fitted into an annular body 46. The bracket 35 corresponds to that shown in my copending application Serial No. 823,371 to which reference has already been made, and is directly secured to the annular body 46.

The operation of the device will be readily understood by referring to the diagram of Fig. 3. The laundry roll heater is here shown as comprised of two sections $43^a$ and $43^b$ and its circuit connections are governed by a line switch 48 and a solenoid switch 49. When the solenoid switch is open and the line switch closed only the resistance section $43^a$ is active while both sections $43^a$ and $43^b$ are active whenever the solenoid switch 49 is closed. The movable contact member 30 of the regulator occupies an intermediate position in which it is not in engagement with either of the stationary contacts, when the temperature at the thermometer 14 is approximately at a predetermined mean value.

Assuming that the solenoid switch 49 is open; that the line switch is closed; and that the movable contact 30 of the regulator engages stationary contact 31, indicating that the temperature is below normal, energy is supplied from line conductor 50 through one blade of the switch 48, conductors 51 and 52, contacts 31 and 30, conductor 53 (which is joined to the contact 30 by a flexible conductor), solenoid coil 54, conductor 55, resistance 56, a portion of which is short-circuited by a switch 57, conductor 58, a conductor 59, and the other blade of the switch 48 to line conductor 60. The coil 54 when energized, closes the switch 49 and opens the switch 57 which is operatively connected to it by a link 61. Circuit connections are now established from conductor 51 through switch 49, conductor 62, solenoid coil 54, conductor 55, the resistance 56 (switch 57 now being open), and conductor 59 through conductor 58. The solenoid is thus held closed, the holding circuit being established through a relatively large resistance in order to avoid unnecessary losses. Another circuit is established through the switch 49, conductor 64, and resistance section $43^b$, to conductor 59. Thus resistance section $43^b$ is connected in multiple circuit relation with resistance section $43^a$. These connections obviously exist independently of the continued engagement of the contacts 30 and 31 and consequently the heater will generate a relatively high heat until the temperature of the roll, in the portion from which the thermometer is influenced, is sufficiently raised to cause the contacts 30 and 32 to come into engagement. Then the coil 54 is short-circuited and the solenoid switch is opened. This serves to break the branch of the circuit established through the resistance $43^b$ and consequently the amount of heat generated is dependent only on the capacity of the resistance $43^a$.

The regulator 13 is mounted with the movable contact member 30 in a radial line when occupying its mid position between the stationary contacts and consequently the centrifugal action due to the rotation of the roll and the regulator will have a minimum effect.

While the laundry roll as shown, is provided with a stationary electric heater, the regulator may be utilized in connection with a laundry roll or similar device in which the heater is also rotated. This arrangement is shown in Fig. 4 and comprises a laundry roll $10^a$ having an end cap or bracket $12^a$ which corresponds to the cap 12 of Fig. 1, but is provided with a cylindrical extension $12^b$ constituting one of the bearings of the roll.

The thermometer tube 14, the regulator 13, and the collector rings 18, 19 and 20 correspond in position and arrangement to the same parts in the structure of Fig. 1.

Instead of the stationary heater 15 a rotatable heater 75 which comprises a central tube or hollow shaft 76 and a solid body 77 of heat absorbing material such as soapstone, is mounted to rotate with the roll, the tube or hollow shaft 76 extending through the bearing extension $12^b$. The cylindrical body 77 of soapstone has a helical groove 78 cut in its periphery to receive a strip 79 of resistance conductor, the ends of which are connected to conductors 80 and 81 located within the tube 76. Secured to the outer end of the tube 76 beyond the bearing extension $12^b$ is a circular plate or disk 82 which supports and forms a part of a collector ring structure. This structure comprises a circular plate or disk 83 and a pair of interposed collector rings 84 and 85, the outer disk 83 being secured to the supporting disk 82 by bolts 86 which extend loosely through suitable holes 87 in the collector rings and are insulated from them by bushings 88 of insulating material. The circuit conductors 80 and 81 are respectively connected to the collector rings 84 and 85, as clearly shown in the drawings and the rings are respectively engaged by stationary brushes 89 and 90. It is thus evident that my invention is equally applicable to laundry rolls which are equipped with either stationary or movable heaters.

As hereinbefore pointed out, my invention is not restricted to laundry rolls and may readily be applied to rotating bodies of various kinds. I therefore intend that only such limitations be imposed as are indicated in appended claims.

What I claim is:

1. In combination with a rotatable body, a stationary heater for imparting heat thereto, a regulator, means associated with the rotatable body for actuating the regulator, and means responsive to the action of the regulator for governing the heat imparted to the rotatable body by the heater.

2. In combination, a rotatable body, a stationary electric heater for imparting heat thereto, a thermometer secured to the body, and means responsive to the temperature of the body and the action of the thermometer for automatically governing the amount of heat imparted to the rotatable body by the heater.

3. In combination, a rotatable, heated body, a thermometer embedded in the body its periphery, a regulator secured to and rotatable with the body and responsive to the action of the thermometer, and means dependent upon the regulator for governing the amount of heat supplied to the body.

4. In combination, a rotatable, heated body, a thermometer embedded in the body near its periphery, a regulator secured to and rotatable with the body and responsive to the action of the thermometer, and stationary means dependent upon the regulator for governing the amount of heat supplied to the body.

5. In combination, a rotatable body, a relatively stationary heater therefor, means for controlling the energy supplied to the heater, a regulator secured thereto and responsive to the temperature of the rotating body for governing the action of said control means.

6. In combination, a rotatable body, a thermometer embedded therein near its periphery, a regulator responsive to the thermometer, a heater for the body, and means responsive to the regulator for controlling the heater.

7. In combination, a rotatable body, a thermometer embedded therein near its periphery, a regulator secured thereto and responsive to the thermometer, a relatively stationary heater for the body, and stationary means responsive to the regulator for controlling the heater.

8. In combination, a laundry roll, a regulator secured thereto and rotatable therewith, a thermometer embedded in the roll near its periphery and adapted to actuate the regulator, a stationary electric heater within the roll, a switch for controlling the amount of energy supplied to the heater, and a sliding connection between the movable regulator and the stationary heater, whereby the control switch is governed in response to the regulator.

9. A laundry roll comprising a cylindrical metal shell, a cap partially closing one end, a stationary electric heater within the roll, a regulator secured to the cap and having a radially disposed movable contact finger and coöperating stationary contacts, a thermometer embedded in the roll near its periphery and connected to influence the regulator in response to the temperature of the roll, a switch for controlling the electric heater and connections between the switch and the regulator whereby the heater is energized and deënergized in response to the action of the regulator.

10. In combination with a rotatable heated body, a regulator movable with the body, means associated with the rotatable body for actuating the regulator, a heater for imparting heat to the body, and stationary means responsive to the action of the regulator for governing the heat imparted to the body of the heater.

In witness whereof, I have hereunto set my hand in the presence of two subscribing witnesses, this 12. day of May, 1914.

WILLIAM S. HADAWAY, Jr.

Witnesses:
F. GRAVES,
ETHEL COHEN.